United States Patent [19]

Ross

[11] Patent Number: 5,393,080
[45] Date of Patent: Feb. 28, 1995

[54] AQUATIC AIR TANK DOLLY

[76] Inventor: Steve F. Ross, 151 Avenida Navarro, San Clemente, Calif. 92672

[21] Appl. No.: 52,396

[22] Filed: Apr. 26, 1993

[51] Int. Cl.[6] ............................................. B62B 1/16
[52] U.S. Cl. ................................. 280/47.26; 280/79.5
[58] Field of Search ..................... 280/651, 652, 47.24, 280/47.26, 47.27, 47.3, 47.32, 63, 79.5; 220/772; 248/129

[56] References Cited

U.S. PATENT DOCUMENTS

| | | | |
|---|---|---|---|
| 4,666,179 | 5/1987 | Adams | 280/47.24 X |
| 4,726,597 | 2/1988 | Hickin | 280/DIG. 6 X |
| 5,071,148 | 12/1991 | Salvucci, Sr. | 280/47.26 X |
| 5,131,670 | 7/1992 | Clements et al. | 280/79.5 X |
| 5,180,179 | 1/1993 | Salvucci | 280/79.5 X |

FOREIGN PATENT DOCUMENTS 2634716  2/1990  France ............................ 280/79.5

Primary Examiner—Mitchell J. Hill
Assistant Examiner—Michael Mar

[57] ABSTRACT

An aquatic air tank dolly having a cup to secure the base of the tank to support on wheels for conveniently moving the tank having side rails rigidly attached to the cup at the base of the tank and attached to the value stem at the top of the tank, the side rails adapted for supporting additional diving equipment during tank transport and tank use underwater.

7 Claims, 4 Drawing Sheets

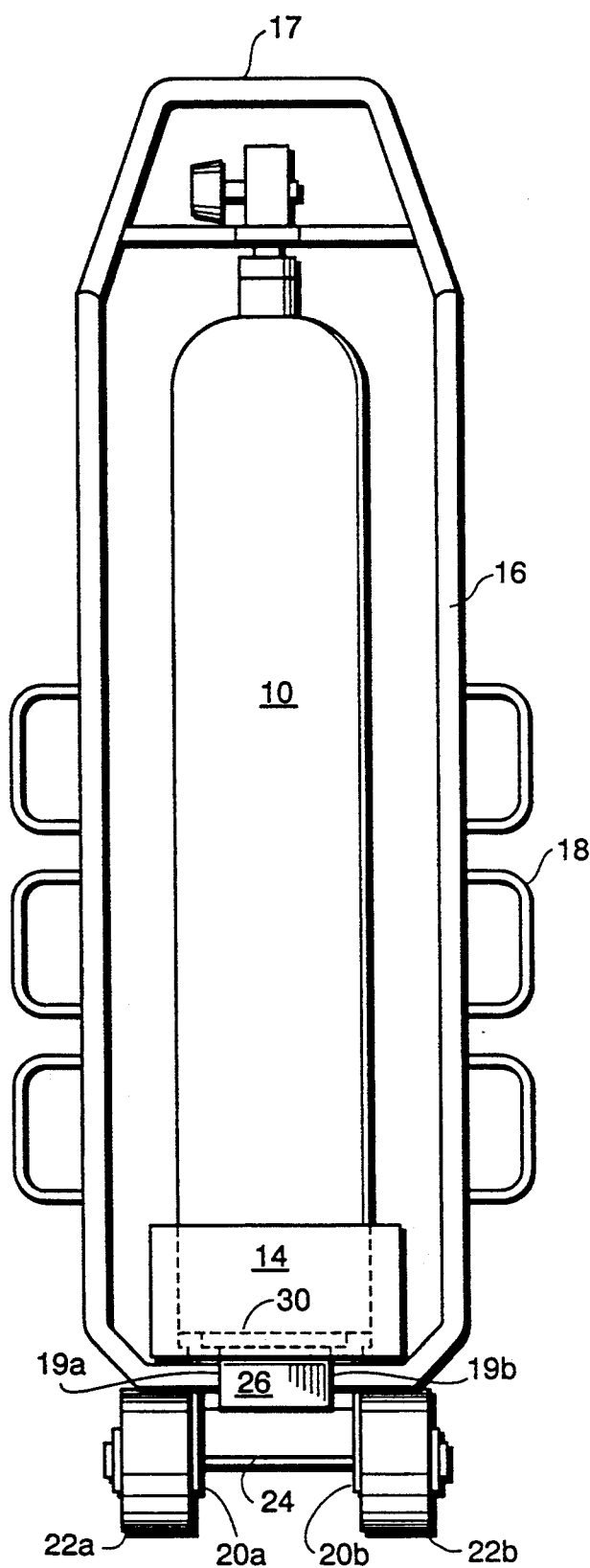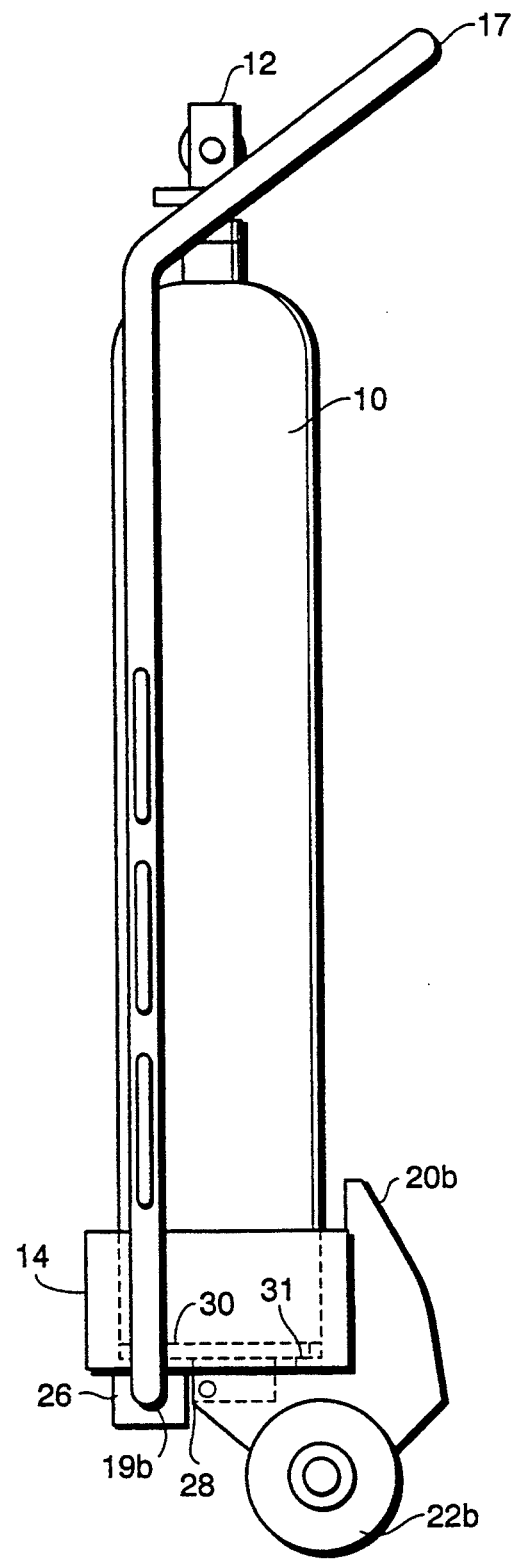
FIG. 1a  FIG. 1b

AQUATIC AIR TANK DOLLY

FIELD OF INVENTION

The present invention relates to aquatic diving apparatus, and more specifically to a dolly attached to an aquatic air tank for transporting the air tank and for supporting additional diving equipment during transport and underwater use.

BACKGROUND OF THE INVENTION

Protective caps covering the bottom of aquatic air tank, such as that disclosed in U.S. Pat. No. 3,809,353, describes protective caps which fit over the lower end the air tank to protect the air tank and to provide a stable base to support the air tank in an upright position. The cap is used to support the tank when out of water, but remains on the tank when underwater.

The "Tank Buddy", is a two wheeled assembly with a PVC plastic tank cradle extending in the shape of a "U" between the wheels and adapted to receive the bottom side of the air tank. A strap is used to secure the bottom of the air tank to the wheeled cradle. The strap is a nylon webbing strap threaded through the cradle and having a cam-over buckle that secures the bottom of the air tank to the cradle. The "Tank Buddy" also contains a nylon rode and handle which separately attached to the value stem of the air tank. This handle is used by the manipulate and move the air tank with the wheeled cradle assembly attached to the bottom of the air tank. The "Tank Buddy" appears to be not intended for underwater use.

Another recent adaptation is the "Tank's Buddy" which includes a wheel assembly attached to a cup, cap or boot which is placed on the bottom on the tank and remains on the tank when diving. This "Tank's Buddy" is used for rolling the air tank about with manual pulling or pushing against the value stem.

The prior art tank supports have been adapted to transport the air tank by rolling wheels. However, divers commonly use additional equipment and gear, including fins, snorkel and weight belts when diving. No means is provided to conveniently transport this gear along with the air tank. The prior art has disadvantageously left the transport of this additional equipment and gear to the diver who is already burden with handling and moving the air tank. Thus, there exist a need for a tank dolly which allows for the support of air tank and the additional equipment and gear.

Handicap individual have long sought to experience under water diving, yet encumbered with physical disabilities. The prior art tank buddies do not provide means for assisting the handicap diver when diving underwater, such as handles on the air tank which may then be handled and manipulated by an assistant to the handicap diver. These and other disadvantages are solved using the present invention.

SUMMARY OF THE INVENTION

A new tank dolly has been invented and improved to include side rails which rigidly attach to the air tank cup having a wheeled assembly to support the base of the tank, and rigidly attached to the value stem of the air tank. The side rails have a plurality of handles for supporting additional equipment and gear or for assisting handicap individual during underwater dives. During underwater dives, an assistant can apply guidance pressure on the rail handles to assist the handicap driver during the underwater dive.

The new and improved air tank dolly assembly is further enhanced using step guards for manipulating and sliding the air tanks over bumps, obstacles or obstructions, such as steps, when transporting the air tank before and after underwater use, without damaging the air tanks. This enables handicap divers to more efficiently transport the air tank over common obstructions that create significant obstacles to the handicap diver.

The aquatic air tank dolly assembly further includes means for rigidly attaching the side rails, wheels and step guard to the cup which is placed on the bottom of the air tank so that the entire assembly function as a dolly suitable for both ground transport and underwater use. These and other advantages will become more apparent from the detailed description of the preferred embodiment.

BRIEF DESCRIPTION OF THE DRAWINGS

FIGS. 1a, 1b, 1c and 1d are assembly drawings of the tank dolly supporting an aquatic air tank, the dolly including a cup attached to side rails, wheels and step guards with fastening means.

DETAILED DESCRIPTION OF THE PREFERRED EMBODIMENT

Figure 1C:
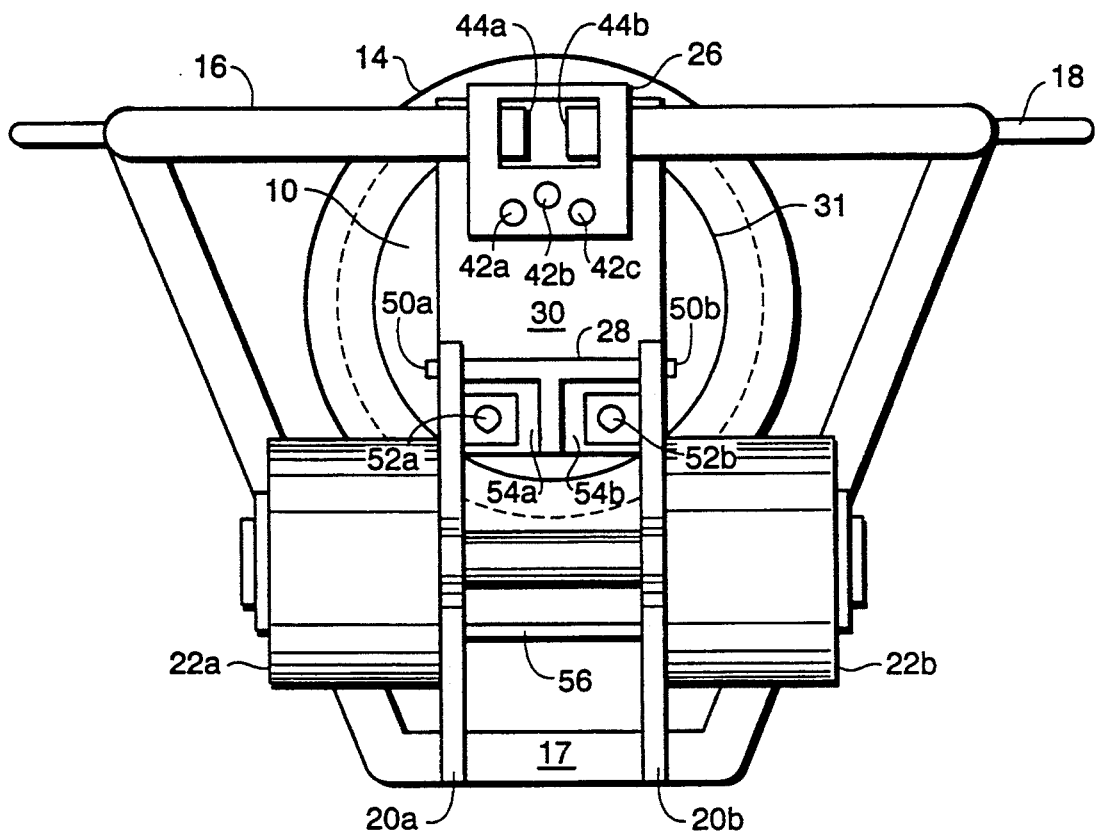

Referring to FIGS. 1a, 1b, 1c and 1d, an aquatic air tank 10 is shown with a valve stem 12 assembled with and supported in a cup 14. Side rails 16, having a plurality of rail handles 18, are attached to the air tank 10. A distal end 17 of rails 16 is attached around the valve stem 12, and the end 17 in formed to function as a dolly handle.

The side rails 16 also have proximal ends 19a and 19b for securing the side rails 16 to the cup 14. Step guards 20a and 20b are attached to wheels 22a and 22b having an axle 24 for rolling of the wheels 22 during movement of the air tank 10. The wheels 22 are used for rolling the air tank 10 over flat surfaces while the guard flanges 20 are used to slide the tank 10 over obstruction or steps in the path of the wheels, so that the air tank 10 is not damaged when the air tank 10 is dragged or slid over the obstructions or steps during transport to and from the water shore line.

Referring to all the Figures, and specifically to FIGS. 1a, 1b, 1c and 1d, rail fastener 26 is used to rigidly attach together proximal rail ends 19a and 19b. Likewise, a guard fastener 28 is used to rigidly attach together step guards 20. Rail fastener 26 and guard fastener 28 are also used to rigidly attach the proximal rail ends 19 and step guards 20 to a fastener plate 30 which is disposed and held between the proximal end of the air tank 10 and a cup flange 31 of the cup 14. The cup 14 is in the form of a cylinder abutting the exterior cylindrical surface of air tank 10. The cup 14 has an inwardly extending flange 31. Cup flange 31 is clamped between the fastener plate 30 and the rail fastener 26 in order to secure the fasteners 26 and 28 to the cup 14 which in turn supports the air tank 10. The fastener plate 30 functions to provide a platform that lies flat against the bottom proximal end of the air tank 10 and which is used to rigidly attach the step guards 20 and rails 16 to the proximal bottom end of the air tank 10.

Figure 1D:
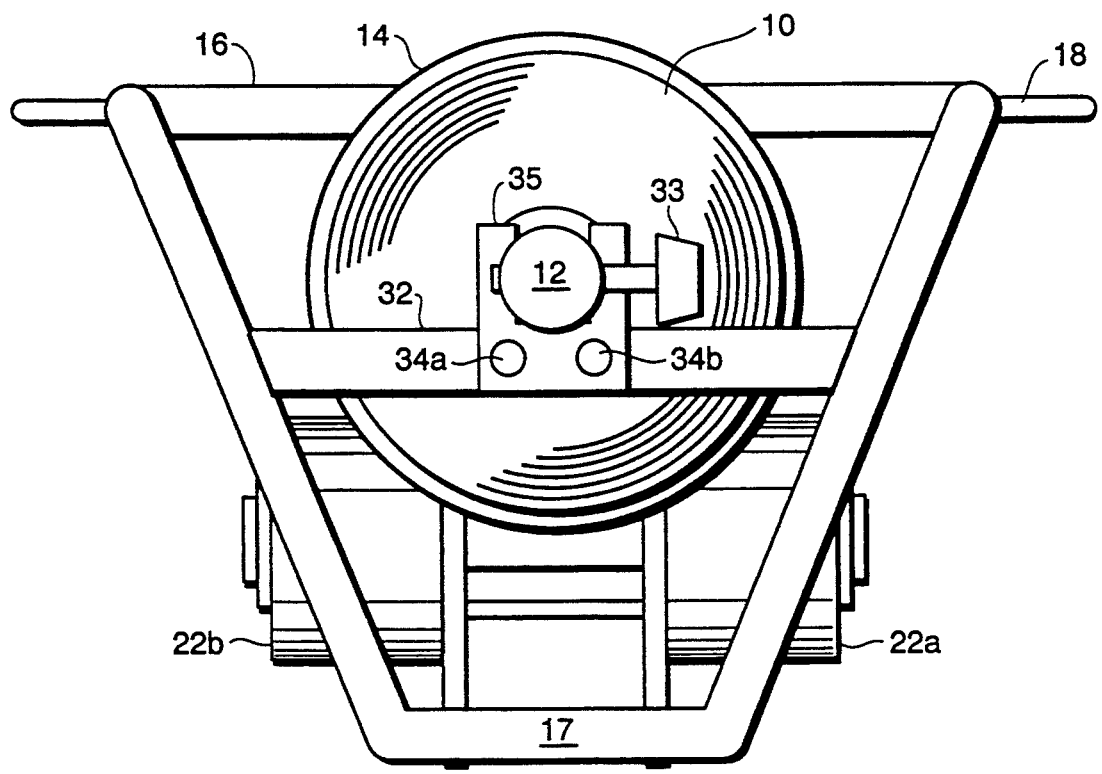
Figure 2A:
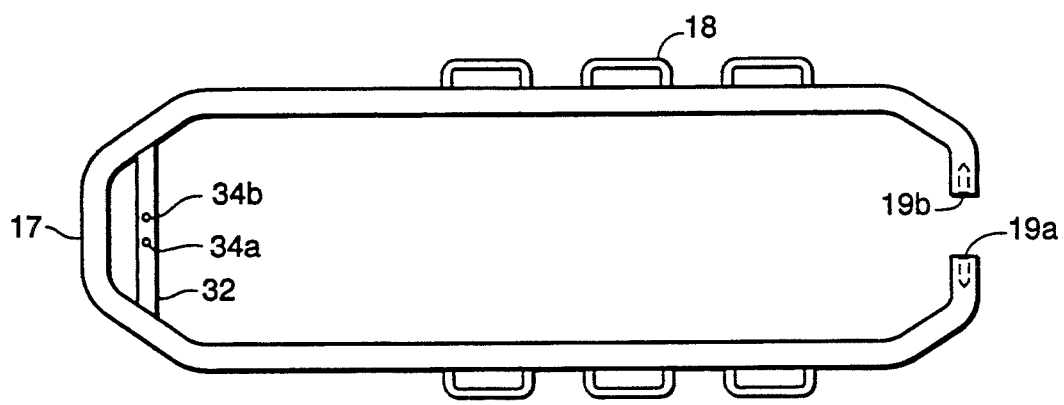
FIGS. 2a, 2b and 2c are top, front and side views drawings of side rails having a plurality of handles.
Figure 2B:
Figure 2C:
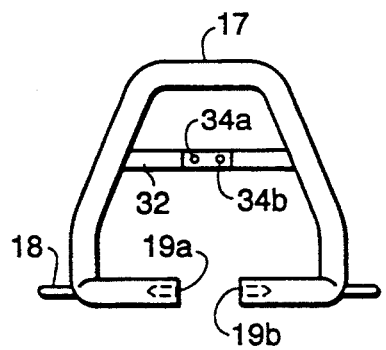

Referring to FIG. 1d, a value stem support 32 is connected, preferably by welding, to the rails 16 near the distal end 17, to abut the value stem 12 having a valve stem knob 33. The knob 33 is use to actuate a gas value regulator (not shown) in the valve stem 12. A valve step bracket 35, generally having a "U" shape is disposed around the valve stem 12 and under the knob 33, and connected to the valve step support 32, preferably by welding at weld points 34a and 34b. The support 32 and bracket 35 function to secure the distal end 17 of rails 16 to the valve stem 12. In other modifications, the distal end 17 of the rails 16 could be attached to the tank 10 below where the valve stem 12 exit the exterior body of the air tank 10 to reduce stress applied directly to the valve stem 12.

Figure 3A:
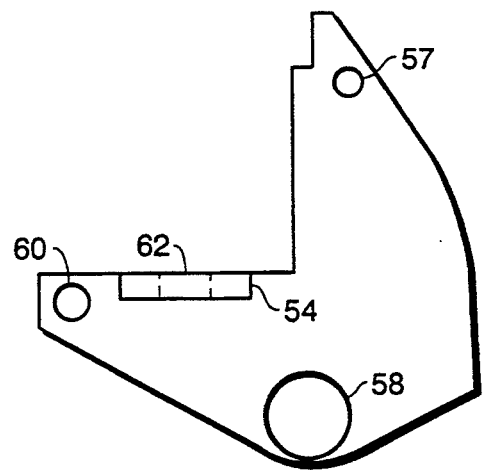
FIGS. 3a and 3b are front and side drawings of the step guards.
Figure 3B:
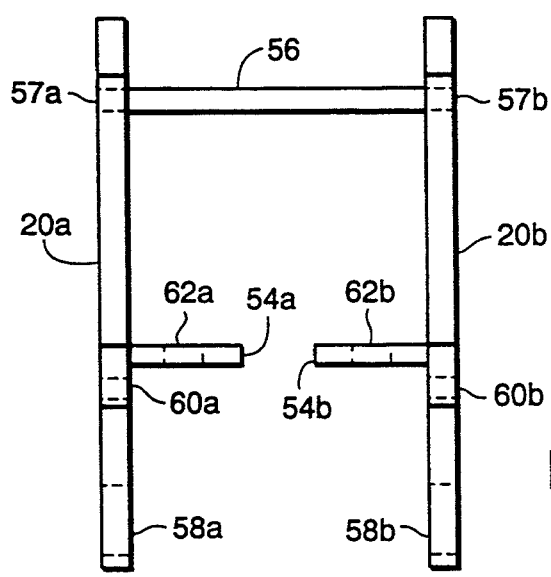

Referring to FIGS. 1, 3 and 4, the rail fastener 26 is securely attached to the fastener plate 30 using bolts 42. Bolts 44 are screwed through the raid fastener 26 into rail ends 19 to securely attach the rail ends 19 to the rail fastener 26. The rail fastener 26 at the proximal end of the air tank 10 and the bracket 35 at the distal end of the air tank 10 provide an end-to-end arrangement for securely attaching the rails 16 to both ends of the air tank 10 so that the rails 16 function to provide a dolly handle at distal rail end 17 for manipulating the tank during movement, and a dolly frame running along the length of the air tank 10. The rails 16 also include side handles 18 for attaching extra gear and equipment along the length of the tank at different points. The handles 18 also provide a convenient handles for use by an assistant to a handicap diver during underwater dives.

Further, the side rails 16 and bottom step guards 20 function to protect the tank 10 during movement. The rails 16 and wheels 22 also provides a stable tripod storage arrangement including the wheels 22a and distal rail end 17 functioning to support the tank 10 when the tank 10 is laid down when not in use, as more clearly shown in FIG. 1d.

Referring to FIGS. 1 and 3, bolts 50 secure together the step guards 20 the guard fastener 28. Bolts 52 are used to secure the step guards 20 to the guard fastener 28 through guard flanges 54. A guard support rod 56 is connected between the step guards 20, preferably by spot welds 57, to strengthen the dolly assembly. Apertures 60 are used to pass bolts 50, while flange apertures 62 are used to pass bolts 52. Blots 50 and 52 are used to secure the step guards 20 to the guard fastener 28 which is rigidly attached to the fastener plate 30.

Referring to all the Figures and particularly FIG. 4, the step guard fastener 28 has threaded holes 64a and 64b to receive bolts 50a and 60b, through holes 60a and 60b, respectively, and has threaded holes 66a and 66b to receive bolts 52a and 52b passing through flanges 54a and 54b. Bolts 52 are screwed into the fastener plate 30 through threaded holes 68a and 68b, respectively, so as to securely and rigidly attach together the step guard 20, guard fastener 28 and the fastener plate 30.

The fastener plate 30 is connected to the rail fastener 26 using bolts 42a, 42b and 42c, passing through threaded holes 70a, 70b, and 70c, and passing through threaded holes 72a, 72b and 72c, respectively, to rigidly attach rail fastener 26 to the fastener plate 30.

The rail fastener 26 has a cavity 73 and apertures 74a and 74b into which the rail ends 19a and 19b are respectively inserted. Bolts 44a and 44b are placed into cavity 73 and then respectively screwed into the threaded holes at the rail end 19a and 19b so secure the rail ends 19 to the rail fastener 26 which is then rigidly attached to fastener plate 30.

Figure 4A:
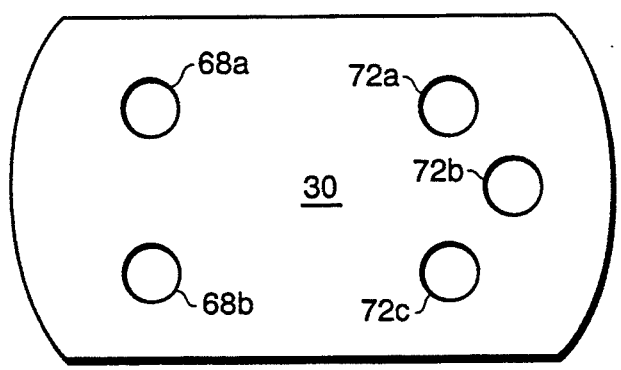
FIGS. 4a, 4b, 4c, 4d and 4e are drawings of the side rail fastener and step guard fastener used to secure the side rails and step guard to the cup.
Figure 4B:
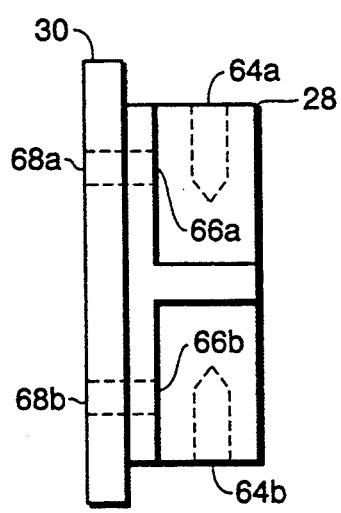
Figure 4C:
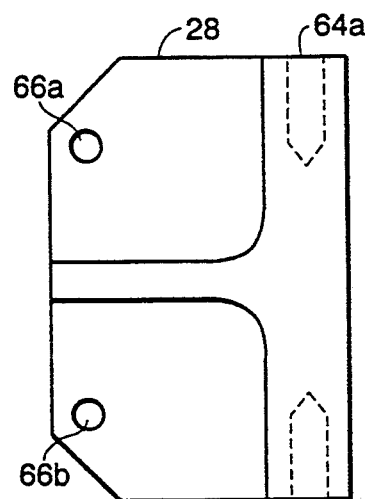
Figure 4D:
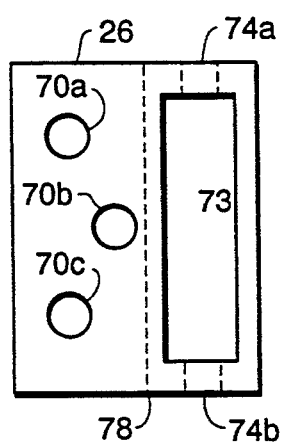
Figure 4E:
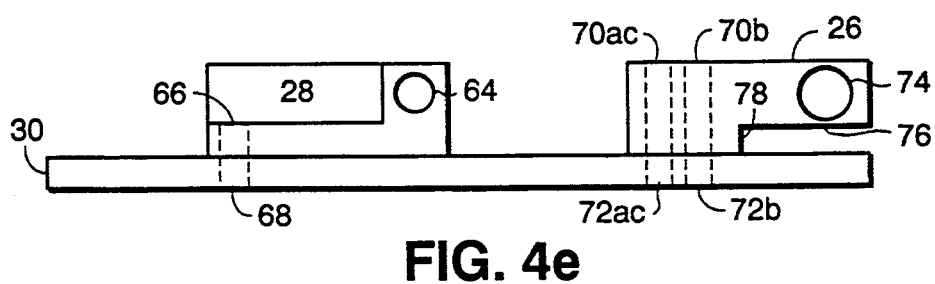

As shown in FIGS. 4e and 1c, the guard fastener 28 and the rail fastener 26 are attached to the fastener plate 30. Plate 30 abuts the proximal end of tank 10. Rail fastener 26 has two cut surfaces 78 and 76 which form a slot when the attached to the fastener plate 30. The cup flange 31 extends into the slot formed by the fastener plate 30 and surfaces 76 and 78 of rail fastener 26. The fastener plate 30 is thus disposed between the bottom of tank 10 and the cup flanges 31 of the cup 14. The fasteners 28 and 26, when bolted into the fastener plate 30, clamp the cup flange 31 rigidly between plate 30 and surface 76 of rail fastener 26 thereby securing the rail fastener 26 and guard fastener to the cup 14.

With both the proximal rail ends 19 securely attached to bottom end of the tank 10, and the proximal rail end 17 attached at the other valve stem end of tank 10, the rails 16 function to provide a dolly frame, provide a dolly handle at rail end 17 and provide additional handles 18 running along the length of the rails 16 and along the length of the air tank 10.

The cup 14 and fastener plate 30 function to support the air tank 10 rigidly connected to the rails 16, guards 22 and wheels 20. Wheels 20 provide for rolling movement of the tank 10 while the guards 22 provide protection and support of the tank 10 when sliding or dragging the tank 10 up and over walking steps or obstruction which block rolling movement.

The tank dolly thus comprises the cup 14, guards 20, wheels 22, and rails 16 and provide scuba divers, in particular those with physical handicaps, a means to carry additional diving gear, which may include fins, weights and snorkel, when moving from a car to the water shore line, to reduce the number of trips, to eliminate the need for a separate carrying device, and to permit less encumbered travel. The assembly of the wheels 22 serves the dual role of providing a wheel set for easy rolling transportation of the diving gear from one location to another, and of providing additional diving weight which is conventionally provided by a set of lead weights which divers strap onto a belt around their waist. Moreover, additional weights can alternatively be strapped onto the rail handles 18 for obtaining the amount of ballast desired, reducing the need to wear waist weight belts.

The cup 14 and rails 16 provide a dolly frame which protect the tank 10 from accidental bumps and impact during movement and use. The rails 16 being dispose around the valve stem 12 having a convention regulator, serves to protect the value stem 12, while further providing a handle 17. When used by handicap divers, the side handles 18 can be handled and manipulated by the handicap diver's assistant who can grab the handles 18 and aid the movement of the handicap diver during water dives. Moreover, the rails 16 allow for safe storage of the air tank 10 in a horizontal position.

While those skilled in the art may make modification to the preferred embodiments, those modifications may nonetheless fall within the spirit and scope of the following claims.

What is claimed is:

1. A dolly for transporting an air tank having a circular bottom end and a valve stem end, said dolly comprising cup means generally in a cylindrical shape adapted for receiving the bottom end of said tank, said cup having a top circular opening for receiving the bottom end of said tank, and having a smaller bottom circular opening defined by an inwardly extending flange, bottom fastener means attached to said inwardly extending flange of said cup means, said bottom fastener means having a plate disposed between said tank and said inwardly extending flange of said cup means, and having a rail fastener and a guard fastener attached to said plate acting to secure said bottom fastener means to said cup, wheel means for rolling said tank during movement, guard means attached to said guard fastener means of said bottom fastener means, said guard means having an outwardly extending edge for sliding said dolly and said tank over movement path obstructions preventing use of said wheels, said guard means also having apertures for attaching said wheel means to said guard means.

rail means attached to said rail fastener means of said bottom fastener means, said rail means extending therefrom towards and attached to the valve stem end of said tank, said rail means functioning as a dolly frame, and valve stem bracket means for fastening together said valve stem end of said tank and a proximal end of said rail means.

2. The dolly of claim 1 wherein said rail means have handles running along the length of said rail means between the bottom the said tank the valve stem end of said tank.

3. The dolly of claim 1 where said rail means are formed and adapted to function as a dolly handle about the valve stem end of said tank.

4. The dolly of claim 1 wherein said rail means about the valve stem end of said tank are formed and adapted to function as a leg upon which the tank rest when in a horizontal position, said tank then resting upon said wheel means and said valve stem end of said rail means.

5. A dolly for transporting an air tank having a circular bottom end and a valve end, said dolly comprising:

cup means generally in a cylindrical shape adapted for receiving the bottom end of said tank, said cup having a top circular opening for receiving the bottom end of said tank, and having a smaller bottom circular opening defined by an inwardly extending flange, bottom fastener means attached to said inwardly extending flange of said cup means, wheels means attached to said bottom fastener means for rolling said tank during movement of the dolly, rail means extending along each side of the tank and attached to said bottom fastener means, said rail means extending therefrom towards and attached to the valve end of said tank, said rail means having a plurality of handles extending therefrom along the length of said tank, and said rail means functioning as a dolly frame, and valve bracket means for fastening together said valve end of said tank and a proximal end of said rail means.

6. The dolly of claim 5 wherein said rail means are formed and adapted to function as a dolly handle about the valve end of said tank.

7. The dolly of claim 5 wherein said rail means about the valve end of said tank are formed and adapted to function as a leg upon which the tank rest when in a horizontal position, said tank then resting upon said wheel means and said valve end of said rail means.

* * * * *